(12) United States Patent
May (10) Patent No.: US 7,794,674 B2
(45) Date of Patent: Sep. 14, 2010

(54) CONSOLIDATED VACUUM SUBLIMATION MODULE

(75) Inventor: Michael May, Miamisburg, OH (US)

(73) Assignee: Sigma-Aldrich Co., St. Louis, MO (US)

(*) Notice: Subject to any disclaimer, the term of this patent is extended or adjusted under 35 U.S.C. 154(b) by 728 days.

(21) Appl. No.: 11/756,457

(22) Filed: May 31, 2007

(65) Prior Publication Data

US 2008/0299023 A1  Dec. 4, 2008

(51) Int. Cl.
*B01D 7/00* (2006.01)
(52) U.S. Cl. .................. 422/244; 23/294 R; 117/200
(58) Field of Classification Search .......... 23/294 R, 23/294 S; 422/244; 117/200; 423/349
See application file for complete search history.

(56) References Cited

U.S. PATENT DOCUMENTS

| 2,602,825 | A | | 7/1952 | Flosdorf | |
| 2,893,850 | A | * | 7/1959 | Von Bichowsky | 422/199 |

FOREIGN PATENT DOCUMENTS

SU  1311747  5/1987

OTHER PUBLICATIONS

Helin et al., Large-Capacity Laboratory Vacuum Sublimation Apparatus, Analytical Chemistry, Oct. 1949, pp. 1284-1285, vol. 21, No. 10.
Novikov, P.A., Effect of the Radiant Heat Component on Heat Transfer in Vacuum Sublimation, NASA Technical Translation, 1962, pp. 1-8, vol. 5, No. 12, National Aeronautics and Space Administration, Washington DC.
Berg et al., Fractional Sublimation of Various Metal Acetylacetonates, Analytica Chemica Acta, 1964, pp. 173-181, Coutes Chemical Laboratories, Louisiana State University, Baton Rouge, LA.
Greenberg, Fred, A Vacuum Sublimator for Student Use, Journal of Chemical Education, dated unknown, p. 720, State University College at Buffalo, Buffalo, New York.
Honjo et al., Vacuum Sublimation Behavior of Various Metal Chelates of 4-Anilino-3-pentene-2-one, Acetylacetone, Dithiocarbamates, Oxine and Its Derivatives, Dimethylglyoxime, Dithizone, 1-(2-Pyridylazo)-2-naphthol, and Tetraphenylporphyrin, Analytical Chemistry, Sep. 1978, pp. 1545-1552, vol. 50, No. 11, Department of Chemistry, Faculty of Science, Kanazawa University, Marunouchi, Kanazawa, Ishikawa, Japan.
I/H Christopher, Chemiker Zeitung, 35, 1325 (1911), a simple Vacuum Sublimation.

* cited by examiner

*Primary Examiner*—Elizabeth L McKane
(74) *Attorney, Agent, or Firm*—Polsinelli Shughart PC (57) ABSTRACT

A consolidated vacuum sublimation module (VSM) can comprise an upper body portion, a middle body portion, a lower body portion, a bushing, and a seal. A vapor director cartridge can be loaded with a crude material and manually inserted into a cartridge-holding member of the lower body portion. Assembly of the middle and upper body portions form a structural unit that can compressively and sealably connect to the lower body portion. During sublimation, heat is effectively transferred to the lower body portion that contains the crude material. A substantial fraction of the middle body portion is conically tapered about a central longitudinal axis to promote desublimation. The middle body portion is a unitary structure that consolidates valving, cooling, and desublimation functions. Following completion of an operational cycle, the vacuum sublimation module is inspected for sublimate presence, then valve-isolated, suitably cooled, detached, opened to a preferred gaseous atmosphere, disassembled, and manipulated for solids recovery.

19 Claims, 6 Drawing Sheets

FIG. 1

PRIOR ART

CONSOLIDATED VACUUM SUBLIMATION MODULE

TECHNICAL FIELD

The invention relates to an apparatus for the purification of condensed-phase materials. More particularly the invention relates to an improved device and a consolidated module for the purification of chemical solids by sublimation.

BACKGROUND

Sublimation refers to a physical purification process. A solid or crude material is placed in a vessel and heated under vacuum. Under sub-atmospheric pressure and controlled heat, a purified fraction of the compound changes directly from the solid to a vapor. By actively or passively cooling a discrete section of the surface of the vessel through which the vapor passes, the purified fraction of the compound can be condensed onto a collector surface while lower volatility impurities are substantially left behind. After the heat source is removed from the vessel and the vacuum is released, the sublimed compound can be collected from the collector surface. This process is usually performed with a sublimation apparatus. Unfortunately, conventional sublimation apparatuses have drawbacks in design.

Figure 1:
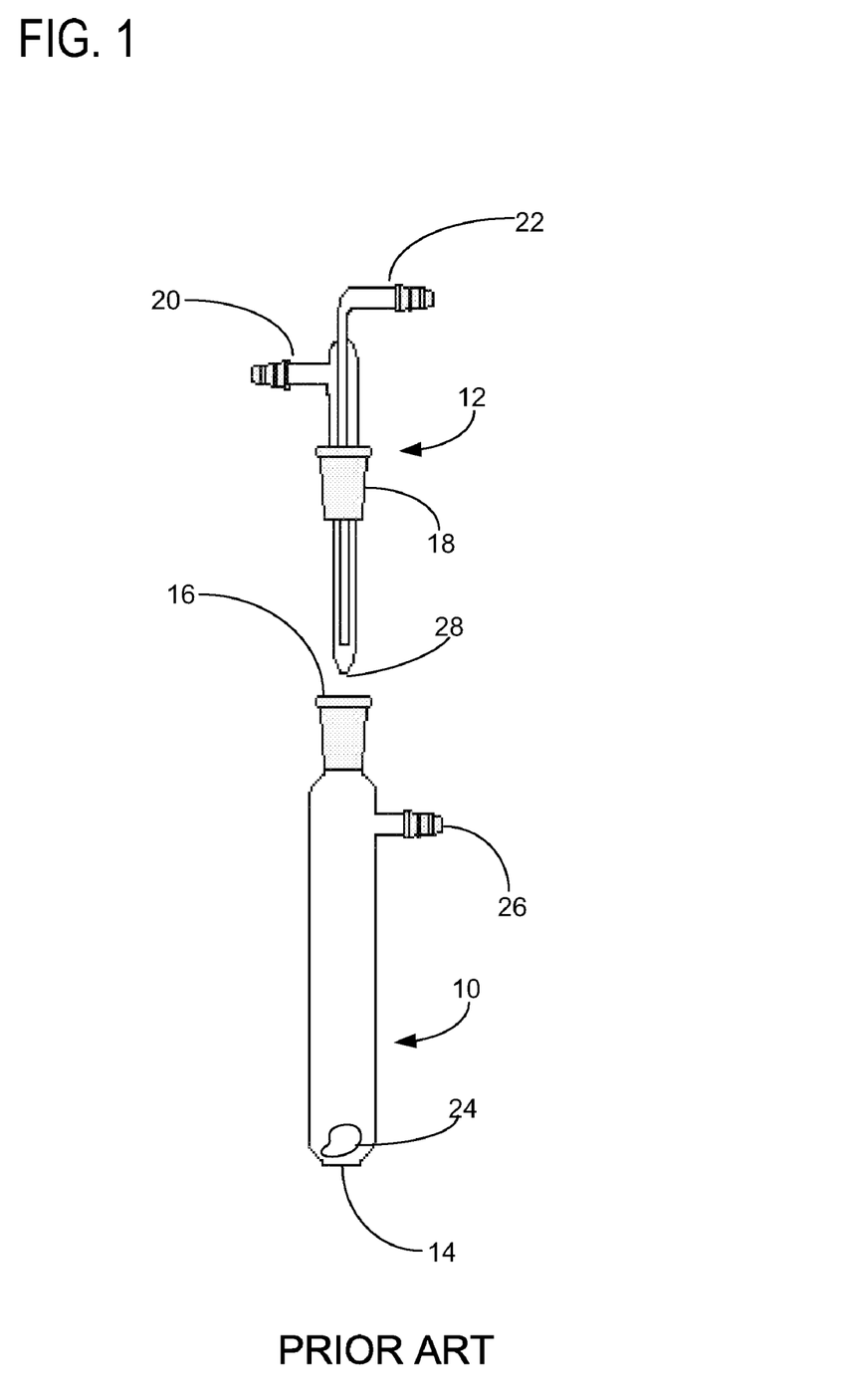
FIG. 1 is an illustration of a conventional sublimation apparatus.

FIG. 1 illustrates an example of a conventional sublimation apparatus. The illustrated conventional sublimation apparatus includes two main body portions: a sublimation chamber 10 and a coolant line assembly 12. The sublimation chamber 10 has a tubular shape and has a closed end 14 and an open end 16 such that the sublimation chamber 10 resembles a test tube. The coolant line assembly 12 includes a joint member 18 that reversibly fits into the open end 16 of the sublimation chamber 10. Coolant is circulated through the coolant line assembly 12 via outlet and inlet ports 20, 22. A crude solid 24 is placed directly in the sublimation chamber 10 and heated under a vaccum applied via a vacuum port 26. Under supplied heat and sub-atmospheric pressure, a fraction of the crude solid 24 may vaporize and condense as a purified material on an actively cooled surface 28 of the coolant line assembly 12, leaving any solid residue inside chamber 10. This cooled surface 28 is often termed a cold finger, is often of limited surface area, and is vertically oriented in FIG. 1. Once heating ceases and the vacuum is released, the joint member 18 can be detached and any purified material can be collected from the cooled surface 28.

The present invention relates to an improved Vacuum Sublimation Module (VSM) comprising a singular combination of design elements to achieve a practical and convenient purification of certain solid materials through factors such as vapor flow directionality, sublimate collection, gas-seal efficiency, pressure-temperature control, power consumption, mechanical reliability, transparency, and user-friendliness.

SUMMARY

In an embodiment, a vacuum sublimation device is specified for causing a vapor from a heated crude material to condense as a purified solid material via desublimation onto a collector surface. The device is a mechanical contrivance that comprises a collector and a cartridge-holding member. The collector has a proximal end with a first diameter and has a distal end with a second diameter. The first diameter is less than the second diameter. The collector also has an inner wall whereby a portion of the inner wall is of a frusto-conical design. The device also includes a vapor director cartridge for holding the crude material. The cartridge-holding member has a proximal end adapted for gastight connection to the distal end of the collector and a distal end adapted to receive and support the vapor director cartridge. The vapor director cartridge can be a monolithic structure that resembles an ampoule.

In another embodiment, a vacuum sublimation module (VSM) is specified for effecting a vapor from a heated crude material to condense to a purified solid material by cooling. The VSM includes a collector having an inner wall whereby a portion of the inner wall is of a frusto-conical design. The collector has a proximal end with a first diameter and has a distal end with a second diameter. The first diameter is less than the second diameter. The VSM also includes a vapor director cartridge for holding the crude material. The VSM includes a cartridge-holding member designed to receive and hold the vapor director cartridge. The cartridge-holding member has a proximal end adapted for gastight connection to the distal end of the collector and has a distal end adapted to receive the vapor director cartridge.

In another embodiment, a vacuum sublimation system is provided for causing a vapor from a heated crude material to condense to a purified solid material by cooling. The system includes a collector having an inner wall whereby a portion of the inner wall is of a frusto-conical design. The collector has a proximal end with a first diameter and has a distal end with a second diameter. The first diameter is less than the second diameter. The system also includes a vapor director cartridge for holding the crude material. The system further includes a cartridge-holding member designed to receive and hold the vapor director cartridge. The cartridge-holding member has a proximal end adapted for connection to the distal end of the collector and has a distal end adapted to receive the vapor director cartridge. The collector and the cartridge-holding member are compressively and sealably joined through combination of a bushing, a seal, the distal end of the collector, and the proximal end of the cartridge-holding member. The seal is uniformly compressed through a screw-driven motion of the bushing.

Additional objectives, advantages and novel features will be set forth in the description which follows or will become apparent to those skilled in the art upon examination of the drawings and detailed description which follows.

BRIEF DESCRIPTION OF THE DRAWINGS

Corresponding reference characters indicate corresponding elements among the several views. The headings used in the figures should not be interpreted to limit the scope of the figures.

DETAILED DESCRIPTION

Figure 2A:
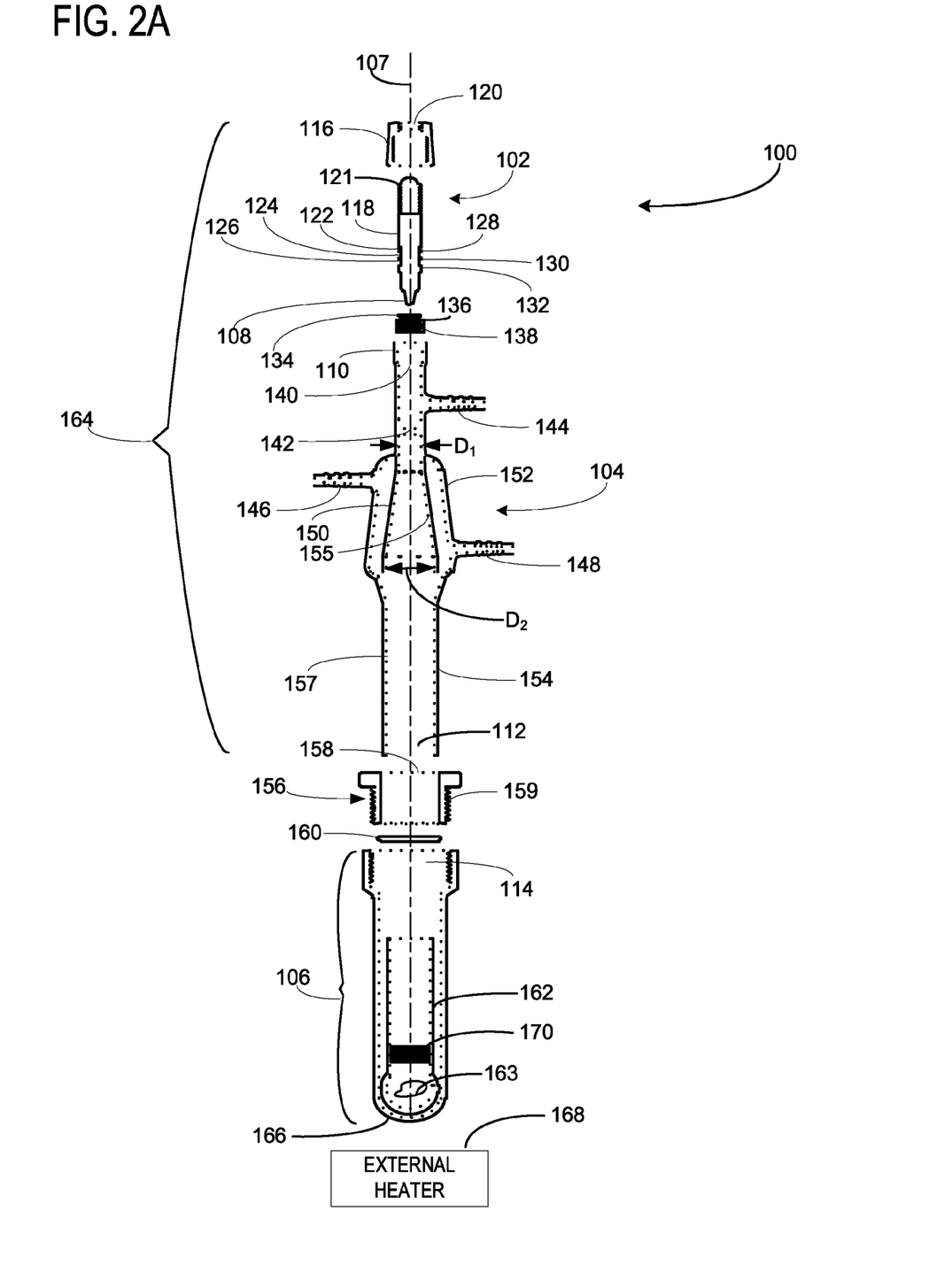
FIG. 2A-2C are cross-sectional views of a vacuum sublimation module (VSM)

Referring now to FIG. 2A, a cross-sectional view of the components of an unassembled vacuum sublimation module (VSM) 100 plus a heater 168 is shown. Structurally, the VSM 100 consists of readily joined subassemblies that can handle repeated use and that can accommodate, for example, intra-module pressure ranging between $10^{-2}$ torr and 760-torr. In particular, the VSM 100 comprises a crude material 163, a bushing 156, a seal 160, an upper body portion 102, a middle body portion 104, and a lower body portion 106 that share a central longitudinal axis 107. As explained in more detail below, a distal end of the upper body portion 102, as indicated by reference character 108, fits within a proximal end of the middle body portion 104, as indicated by reference character 110. A distal end of the middle body portion 104, as indicated by reference character 112, can be mechanically connected to a proximal end of the lower body portion 106, as indicated by reference character 114. Proximal and distal are terms used herein that denote a relative position with reference to the center of either VSM 100 or a component thereof, with proximal being toward the top in FIG. 2A. Longitudinal and transverse are terms used herein that denote a relative direction with reference to the center of VSM 100, with longitudinal being parallel to the vertical direction in FIG. 2A.

The upper body portion 102, or plunging member, comprises a handle 116 and valve stem 118. The handle 116 has a central opening 120 therethrough adapted to receive a threaded end 121 of the valve stem 118. The interior of the handle 116 is further adapted to threadably attach onto the proximal end 110 of the middle body portion 104 in order to permit adjustable gas flow between the interior of a vacuum port 144 and the interior of the middle body portion 104. For example, the proximal end 110 of the middle body portion 104 can have external threads that mate internal threads of the handle 116.

The distal end 108 of the upper body portion 102, which also corresponds to a distal end of the valve stem 118, is tapered and adapted to fit within the proximal end 110 of the middle body portion 104. The valve stem 118 comprises recessed grooves 122, 124, 126 that are associated with first protuberance 128, second protuberance 130, and a rim 132. An o-ring 134 may fit around recessed groove 122, and gaskets 136, 138 fit around recessed grooves 124, 126, respectively. When the VSM 100 is assembled and evacuated, o-ring 134 and gaskets 136, 138 function to retard the rate of environmental gas leakage into the evacuated interior of VSM 100. Components of the upper body portion 102 can form a plunger member that is sealably accepted by the proximal end 110 of middle body portion 104, thereby mechanically securing the upper body portion 102 to the middle body portion 104. As such, a plunger member can be readily removed and reinserted into the middle body portion 104. The combination of upper body portion 102 plus an acceptor element 140 of the middle body portion 104 facilitates the option of high vacuum sublimation (i.e., intra-module pressure <$10^{-3}$ torr).

The middle body portion 104 functions in part as a sublimate collector, and it comprises the acceptor element 140, a valve seat 142, a vacuum port 144, an outlet coolant port 146, an inlet coolant port 148, a tapered upper collector 150, a coolant jacket 152, and a tubular lower collector 154. Preferably, the middle body portion 104 embodies one unitary structure that includes an inner wall 157, jacket 152, and acceptor element 140. The inner wall 157 extends the length of middle body portion 104 except for an open area at vacuum port 144. The distal end 112 of middle body portion 104 has a greater diameter than proximal end 110. Integrally fused between the tubular lower collector 154 and acceptor element 140 is a tapered section 150 having a frusto-conical shape. Advantageously, since middle body portion 104 includes a section that is shaped frusto-conical, the present VSM 100 promotes an improved collection and recovery of the sublimate. Moreover, the acceptor element 140 is preferably fused with middle body portion 104 so that valve stem 118 can be positively compressed within acceptor element 140, thereby forming a substantially gastight connection between the VSM interior and vacuum port 144.

The tubular lower collector 154 extends approximately from the bottom of coolant jacket 152 to the distal end 112 of the middle body portion 104. The proximal end 110 and the distal end 112 of the middle body portion 104 are each tubular in shape, but the inner diameter of the distal end 112 (example 20-mm) is larger than the inner diameter of the proximal end 110 (example 10-mm). The tapered upper collector 150 corresponds to the middle body portion 104 that structurally transitions from a lesser diameter of the inner wall 157 to a greater diameter of the inner wall 157. That is, tapered upper collector 150 is conically tapered or has a frusto-conical construction. For example, as shown in FIG. 2A, the inner wall of the tapered upper collector transition from a first diameter $D_1$ to a second diameter $D_2$. As can be seen the first diameter $D_1$ is less than the second $D_2$.

Coolant jacket 152 ordinarily contacts the distal end of tapered upper collector 150 through a ring seal. During a sublimation process, the coolant jacket 152 can be used for circulation of a coolant such as water or gas around the exterior of the tapered upper collector 150 via an outlet port 146 and an inlet port 148. Utilizing joined collectors 150 and 154, some vaporized fraction of a crude material can be condensed onto the inner wall 157 of middle body portion 104 and thereafter recovered.

The vacuum port 144 can be exploited to establish and sustain sub-atmospheric pressure to an assembled vacuum sublimation module 100. In particular, the vacuum port 144 provides a gas conduit between the interior of the middle portion 104 and a vacuum source.

The middle body portion 104 can be connected to the lower body portion 106 by a variety of different systems, such as coupling the two portions with a threaded bushing 156 and the seal 160. Alternatively, a press fit could be used or similar member to hold the middle body portion 104 in contact with the lower body portion 106. In particular, the bushing 156 has a central opening 158 therethrough adapted to receive the distal end 112 of the middle body portion 104. The bushing 156 has an externally threaded portion 159 adapted to mate a proximal end 114 of the lower body portion 106. For example, the proximal end 114 of the lower body portion 106 can have internal threads that mate the externally threaded area 159 of the bushing 156 such that the bushing 156 compressively contacts the seal 160 against a distal section of tubular lower collector 154 when the bushing 156 is threadably connected with lower body portion 106. The seal 160 can be, for example, an elastomeric o-ring seal that helps achieve a gastight connection between middle body portion 104 and lower body portion 106.

Figure 2B:
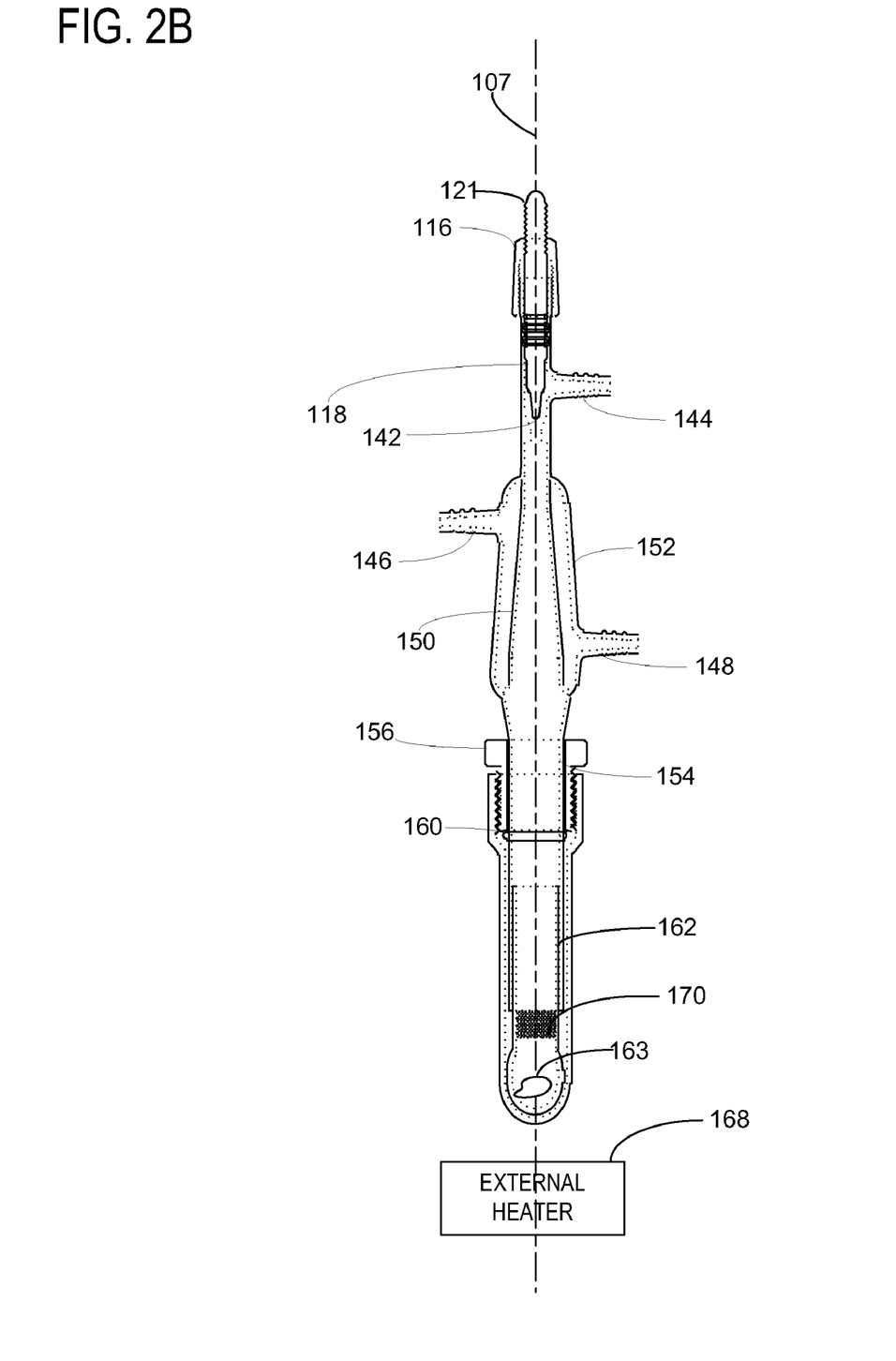

During a routine sublimation process, a vapor director cartridge 162, that may resemble an ampoule, can be loaded with a crude material 163 and manually inserted into the cartridge-holding member of the VSM 100. Thereby, the loaded vapor director cartridge 162 directly contacts and is supported by a distal end of the lower body portion 106, as indicated by reference character 166. Assembly of the VSM 100 forms concentric overlapping sleeves that spatially connect the interior of vapor director cartridge 162 to the interior of the middle body portion 104 (See FIG. 2B). A substantial fraction of middle body portion 104 may be conically tapered by about 2 to 15 angular degrees about an axis parallel to the central longitudinal axis 107 and coincident with the wall of lesser inner diameter. According to one aspect of the invention, the tapered upper collector 150 has a length-to-diameter ratio that is greater than or equal to five (i.e., L/D>5, where D corresponds to the lesser inner diameter of the tapered upper collector 150). This elongated and tapered shape is advantageous for desublimation because it promotes vapor-collector contact throughout the frusto-conical or tapered region of the middle body portion 104.

Collectively, the upper body portion 102 and the middle body portion 104 represent a collector-jacket-valve subassembly 164. As such, a vacuum sublimation system may comprise: the lower body portion 106, vapor director cartridge 162, collector-jacket-valve subassembly 164, bushing 156, gas seal 160, electric heater 168, heat transfer promoter (not shown), variable autotransformer (not shown), temperature sensor (not shown), coolant (not shown), coolant controller (not shown), and vacuum source (not shown). During sublimation, heat is effectively transferred from the heater 168 to a distal section of the lower body portion 106 and ultimately to crude material 163.

According to one aspect, an assembled VSM 100 has a transverse projection of about 8 centimeter (cm) and a maximum length of 34 cm. However, it is contemplated that the module dimensions can be adjusted while retaining the core design. For example, an alternative version may have a transverse projection of about 10 cm and a maximum length of 38 cm.

Notably, middle body portion 104 is designed to permit either active (forced circulation through the coolant jacket 152) or passive (environmental) cooling as needed.

The VSM 100 is preferably constructed with corrosion-resistant materials such as borosilicate glass, fused silica, fluorocarbon elastomers, fluorocarbon polymers, or stainless steel. As desired, various optional elements could be added to this VSM 100 such as collector wall-knurl, flexible mesh inserts (e.g., mesh 170), quartz wool inserts, heat-transfer promoters, intra-module packing materials, specialized sensor ports, and external vapor traps.

Figure 2C:
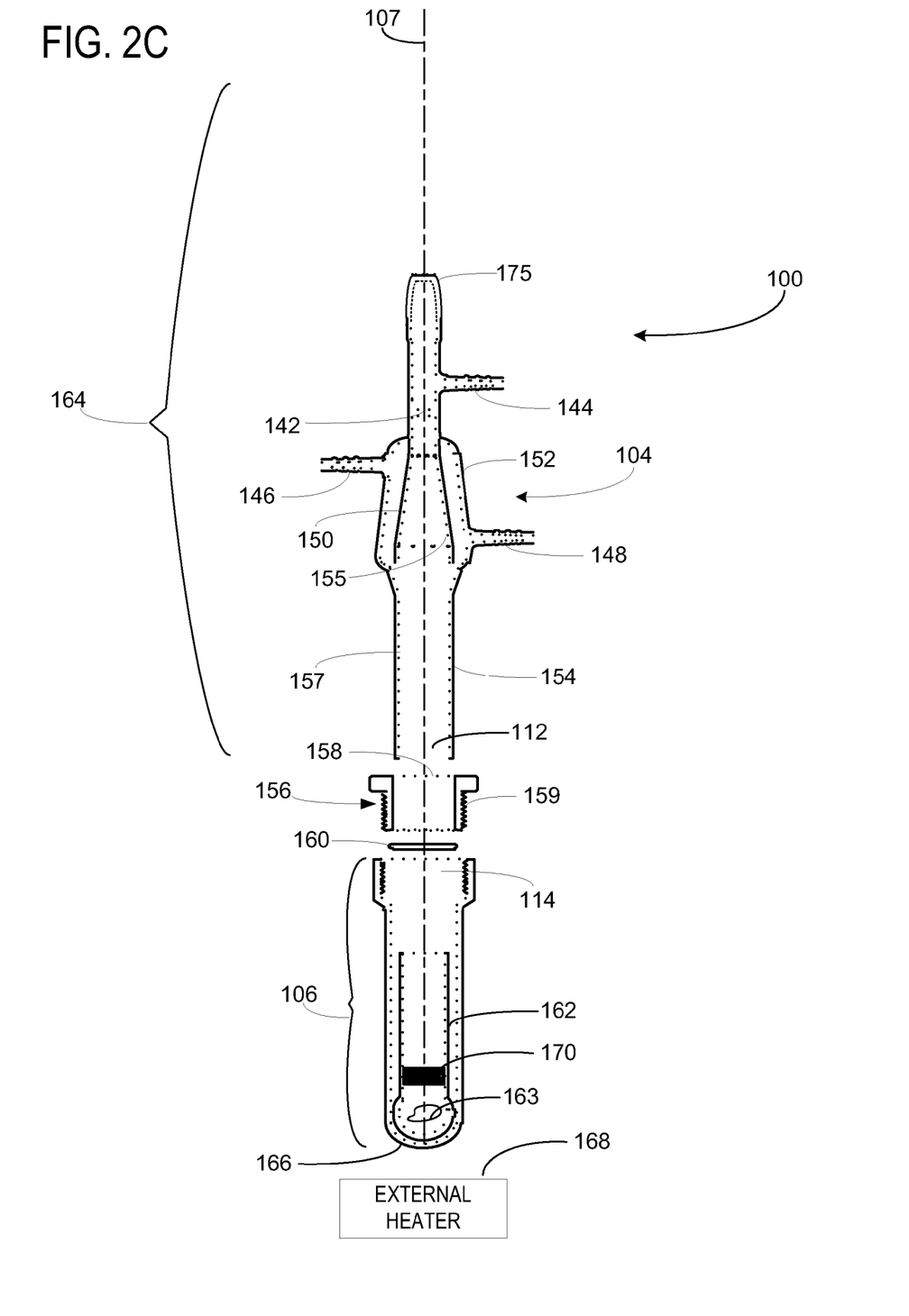

According to another aspect, the VSM 100 may include a collector-jacket subassembly, a bushing 156, a seal 160, and a lower body portion 106. In other words, said upper body portion 102 could be eliminated. For example, as shown in FIG. 2C, the collector-jacket subassembly can embody a capped or alternatively a fused-closed end, as indicated by reference character 175. That is, closed end 175 can be a fused-glass component of the collector-jacket subassembly (i.e., an integrally molded component). Regarding various embodiments of VSM 100, any collected sublimate could be conveniently recovered through ends 110 and 112 of FIG. 2A, or through port 144 and end 112 of FIG. 2C.

Figure 3:
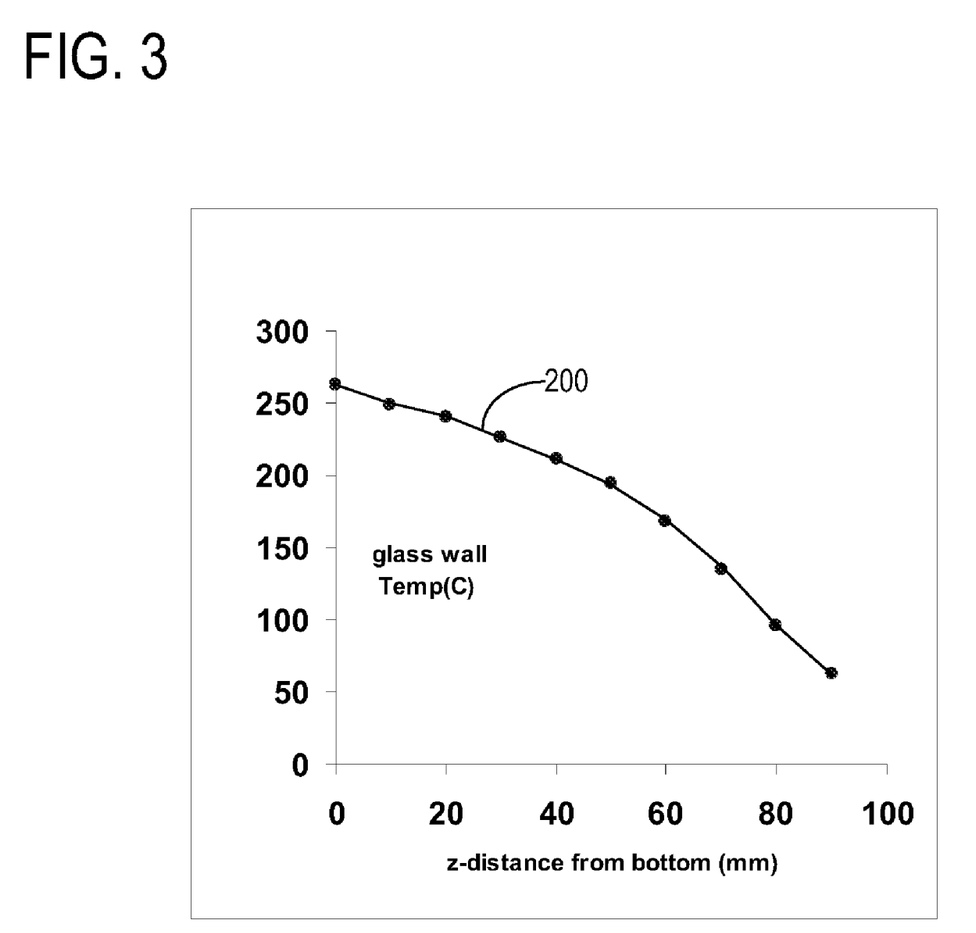
FIG. 3 is an exemplary chart of longitudinal temperature profile as measured along a cartridge-holding member wall.
Figure 4:
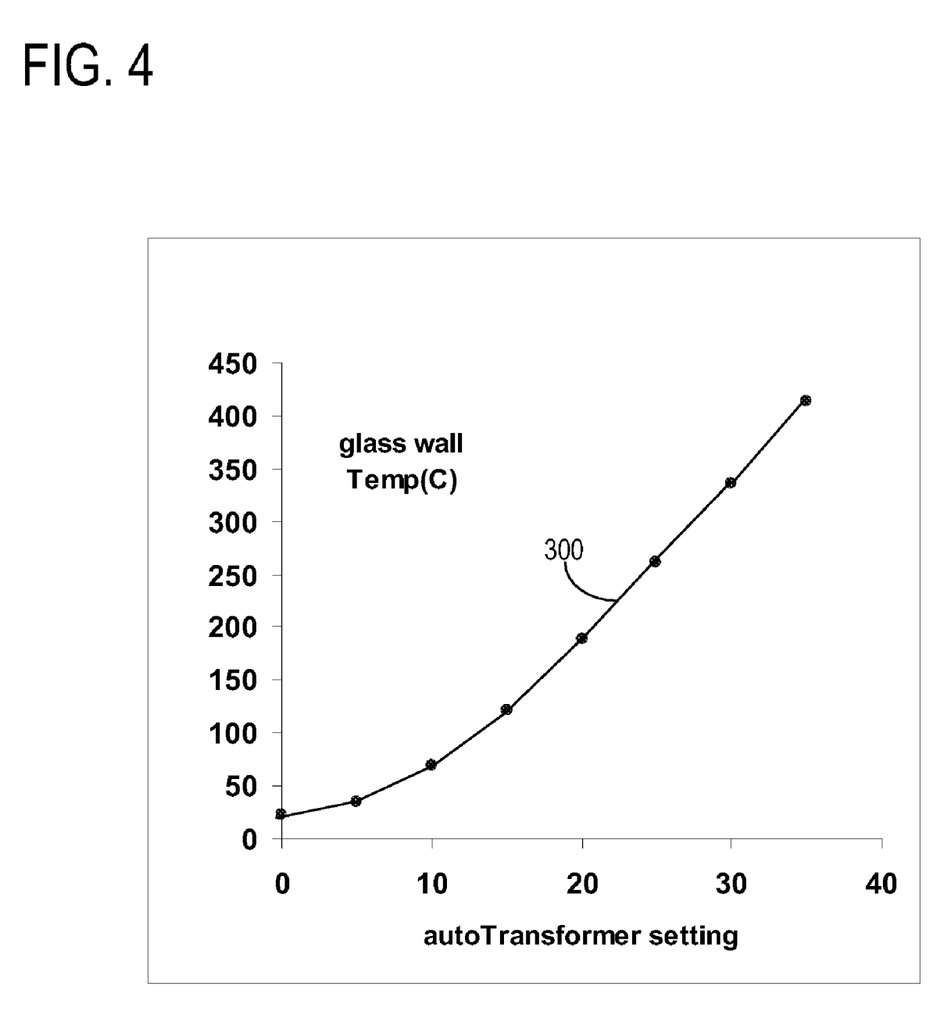
FIG. 4 is an exemplary chart of temperature near the distal end of the cartridge-holding member versus an electric transformer setting when part of the cartridge-holding member was in contact with a heat transfer promoter being heated.

FIG. 3 depicts an exemplary longitudinal temperature profile 200 as measured along the inside wall of the cartridge-holding member (measured in air). Some contact between lower body portion 106 and vapor director cartridge 162 allows heat to be transported to the crude material 163 substantially by conduction. The temperature profile 300 displayed in FIG. 4 demonstrates that temperatures from +25° C. to >+400° C. can be controllably imposed onto the distal end 166 of the lower body portion 106 by utilizing an external heater such as an electric mantle packed with sand.

Moreover, the present sublimation system is reasonably energy efficient. According to one aspect, about 20-watt of input power generated about +260° C. near the base of lower body portion 106. Following completion of an operational cycle, the VSM 100 can be inspected for sublimate presence, then valve-isolated, suitably cooled, detached, opened to a chosen gaseous atmosphere, disassembled, and manipulated for solids recovery.

The specific design of VSM 100 provides an improved sublimation process. For example, a removable vapor director cartridge 162 can be easily incorporated within VSM 100. In particular, the vapor director cartridge 162 is dimensioned so that its wider bottom just slips inside the lower body portion 106, while the narrower top of the vapor director cartridge 162 slips inside the tubular lower collector 154 (see FIG. 2B). The geometry of the vapor director cartridge 162 preferentially aims a vaporized stream upward into collector regions for convenient sublimate recovery. Moreover, multiple design elements are consolidated to minimize vapor loss and improve sublimate capture. Namely, the desublimation, cooling, and valving functions are unified in one structure (e.g., collector-jacket-valve subassembly 164). As stated above, tubular upper collector 150 has an elongated conical taper (approximately 2 to 15 angular degree) and collector 150 is preferably positioned within the longitudinal limits of coolant jacket 152. Positioned above the upper collector 150 in FIG. 2A is the valve seat 142, and positioned above valve seat 142 is the vacuum port 144. The architecture of the collector-jacket-valve subassembly 164 promotes high collector area, longitudinal vapor trajectories, and adjustable cooling.

Furthermore, a gastight connection between the portion 104 and the portion 106 is established by positive compression of a ring seal (e.g., seal 160) from a rotatable screw drive. Positively and uniformly compressed joints are especially reliable and gastight. For example, the module static leak rate has been measured to be less than 20-ppmv air per hour across 740-torr of differential pressure (o-ring size 212). Moreover, the lower body portion 106 is constructed with extended longitudinal depth so that its distal section can be enclosed within a complementary heater. Thus, by design the high-temperature vaporization region is quasi-isolated from the gastight connection region of lower body portion 106. Utilizing for example a 100-mm deep electric mantle (assisted by sand to promote heat transfer), a perylene-containing mixture was vaporized near +195° C. whilst the gastight connection region (with ring seal) registered about +30° C. The round shape of the distal end 166 of lower body portion 106 is more resistant to implosion than flat-bottom designs, and thus inherently safer. Lastly, glass fusion of the acceptor element 140 directly onto tubular upper collector 150 facilitates the useful option of high-vacuum sublimation ($<10^{-3}$ torr). The built-in valve also helps avoid undesirable scatter of crude material 163 into collector regions and it partially regulates the vapor flux during operations.

When introducing elements of aspects of the invention or the embodiments thereof, the articles "a," "an," "the," and "the" are intended to mean that there are one or more of the elements. The terms "comprising," "including," and "having" are intended to be inclusive and mean that there may be additional elements other than the listed elements.

As various changes could be made in the above designs, constructions, products, and methods without departing from the scope of aspects of the invention, it is intended that all matter contained in the above description and shown in the accompanying drawings shall be interpreted as illustrative and not in a limiting sense.

EXAMPLES

The VSM 100 is especially useful for purification of certain solids that may function as standard materials in a quality control laboratory. Four illustrative applications include the physical purifications of ferrocene, perylene, acenaphthene, and pentachlorobenzene. For example, 5.02-gram of commercial ferrocene was purified overnight under dynamic vacuum <0.1-torr near +82° C. (temperature near the bottom of lower body portion 106) to yield 5.00-gram of purified ferrocene plus a brownish residue. An infrared spectrum of the brownish residue confirmed that it was a mixture composed of ferrocene plus a substantial fraction of other materials. Considering another case, 2.86-gram of commercial perylene was sublimed for >72-hour under dynamic vacuum <0.1-torr near +195° C. to yield 2.41-gram of purified perylene. Citing a third example, 2.26-gram of commercial acenaphthene was processed overnight near +40° C. under dynamic vacuum to afford two solid fractions, a nearly colorless sublimate and a yellowish residue. Net solid material retention (within VSM 100) for the acenaphthene sublimation was about 95-mass %. Lastly, 5.16-gram of commercial pentachlorobenzene was sublimed overnight under dynamic vacuum near +44° C. Afterward, about 3.4-gram of purified pentachlorobenzene was manually recovered and the net solid material retention (within VSM 100) was ≧99-mass %. For each case outlined above, passive collector cooling was utilized to effect desublimation.

What is claimed is:

1. A vacuum sublimation device for effecting a vapor from a crude material being heated and condensing the vapor to a purified solid material by cooling, the device comprising:
   a collector having an inner wall, wherein the inner wall of the collector has a first diameter at a proximal end of the collector and has a second diameter at a distal end of the collector, the first diameter being less than the second diameter, and wherein a portion of the inner wall has a frusto-conical design;
   a vapor director cartridge for holding the crude material;
   a cartridge-holding member designed to receive and hold the vapor director cartridge, the cartridge-holding member having a proximal end adapted for connection to the distal end of the collector and having a distal end adapted to receive the vapor director cartridge; and
   a coupler mechanism to sealably join the collector and the cartridge-holding member, wherein the collector and the cartridge-holding member are compressively and sealably joined through combination of a bushing, a seal, the distal end of the collector, and the proximal end of the cartridge-holding member, wherein the seal is uniformly compressed through a screw-driven motion of the bushing.

2. The vacuum sublimation device of claim 1, wherein the bushing has a central opening therethrough adapted to receive the distal end of the collector and has an externally threaded portion adapted to mate the proximal end of the cartridge-holding member such that the bushing compressively contacts the seal against the distal end of the collector when the bushing is threadably connected with the cartridge-holding member.

3. The vacuum sublimation device of claim 1 further including a plunger member dimensioned to be accepted by the collector, wherein the plunger member is a valve for adjusting gas flow between the interior of a vacuum port and the interior of a middle body.

4. The vacuum sublimation device of claim 3, wherein the plunger member and the collector are mechanically and sealably joined to form a collector-jacket-valve subassembly.

5. The vacuum sublimation device of claim 3, wherein the plunger member comprises a valve stem and a handle having a central opening therethrough adapted to receive a threaded end of the valve stem, wherein an interior of the handle is further adapted for mechanical connection to the proximal end of the collector, and wherein the collector is a unitary structure that comprises:
   an acceptor element and a valve seat located at the proximal end of the collector such that a distal end of the valve stem contacts the valve seat when inserted into the proximal end of the collector;
   a vacuum port to establish a sub-atmospheric pressure within the vacuum sublimation device during a sublimation process;
   a tapered upper collector structurally transitioning from a portion of the inner wall having the first diameter to a portion of the inner wall having the second diameter; and
   a coolant jacket around the tapered upper collector used for cooling the tapered upper collector, the coolant jacket having an inlet coolant port and an outlet coolant port for circulation of a coolant through the coolant jacket and around the tapered upper collector for cooling the vapor to condense the purified solid material.

6. The vacuum sublimation device of claim 5, wherein the tapered upper collector has a length-to-diameter ratio greater than or equal to five.

7. The vacuum sublimation device of claim 5, wherein the valve stem, the collector, the bushing, the seal, and the cartridge-holding member are each constructed of corrosion-resistant materials selected from at least one of the following: borosilicate glass, fused silica, fluorocarbon elastomers, fluorocarbon polymers, or stainless steel.

8. The vacuum sublimation device of claim 5, wherein the proximal end of the cartridge-holding member overlaps the distal end of the collector, and the proximal end of the collector overlaps the distal end of the plunger member when the vacuum sublimation module is assembled.

9. The vacuum sublimation device of claim 8, wherein the inner wall of the tapered upper collector is conically tapered by 2 to 15 angular degrees about an axis that is parallel to the central longitudinal axis and coincident with the inner wall having the first diameter.

10. The vacuum sublimation device of claim 1, wherein the proximal end of the cartridge-holding member is spaced longitudinally apart from the distal end of the cartridge-holding member, said spacing being at least 10 centimeters.

11. The vacuum sublimation device of claim 1, wherein the distal end of the cartridge-holding member portion is round in shape.

12. A vacuum sublimation module for effecting a vapor from a crude material being heated and condensing the vapor to a purified solid material by cooling, the module comprising:
   a collector having an inner wall, wherein the inner wall of the collector has a first diameter at a proximal end of the collector and has a second diameter at a distal end of the collector, the first diameter being less than the second diameter, and wherein a portion of the inner wall has a frusto-conical design;
   a vapor director cartridge for holding the crude material;
   a cartridge-holding member designed to receive and hold the vapor director cartridge, the cartridge-holding member having a proximal end adapted for connection to the distal end of the collector and having a distal end adapted to receive the vapor director cartridge;
   a coupler mechanism to sealably join the collector and the cartridge-holding member; and
   a plunger member, wherein the plunger member and the collector are mechanically and sealably joined to form a collector-jacket-valve subassembly, and wherein the vacuum sublimation module is utilized for a hiqh-vacuum application.

13. The vacuum sublimation module of claim 12, wherein the distal end of the collector corresponds to a tubular lower collector, and wherein the tubular lower collector is connected to the cartridge-holding member via a bushing and a seal, the bushing having a central opening therethrough adapted to receive the tubular lower collector and having an externally threaded section adapted to mate the proximal end of the cartridge-holding member such that the bushing compressively contacts the seal against the collector when the bushing is threadably connected with the cartridge-holding member.

14. The vacuum sublimation module of claim 12, wherein the plunger member comprises a valve stem and a handle having a central opening therethrough adapted to receive a threaded end of the valve stem, wherein an interior of the handle is further adapted for mechanical connection to the proximal end of the collector, and wherein the collector is a unitary structure that comprises:
   an acceptor element and a valve seat located at the proximal end of the collector such that the distal end of the valve stem contacts the valve seat when inserted into the proximal end of the collector;
   a vacuum port to establish a sub-atmospheric pressure within the vacuum sublimation module during a sublimation process;
   a tapered upper collector structurally transitioning from a portion of the inner wall having the first diameter to a portion of the inner wall having the second diameter; and
   a coolant jacket around the tapered upper collector for cooling the tapered collector, the coolant jacket having an inlet coolant port plus an outlet coolant port for circulation of a coolant through the coolant jacket and around the tapered upper collector for cooling the vapor to condense the purified solid material onto the inner wall.

15. The vacuum sublimation module of claim 14, wherein the tapered upper collector has a length-to-diameter ratio greater than or equal to five, wherein a diameter value of the length-to-diameter ratio corresponds to the portion of the inner wall having the first diameter.

16. The vacuum sublimation module of claim 14, wherein the valve stem, the collector, the bushing, the seal, and the cartridge-holding member are each constructed of corrosion-resistant materials selected from at least one of the following: borosilicate glass, fused silica, fluorocarbon elastomers, fluorocarbon polymers, or stainless steel.

17. The vacuum sublimation module of claim 12, wherein the distal end of the cartridge-holding member is round in shape.

18. A vacuum sublimation system for causing a vapor from a heated crude material to condense to a purified solid material by cooling, the system comprising:
   a collector having an inner wall, wherein the inner wall of collector has a first diameter at a proximal end of the collector and has a second diameter at a distal end of the collector, the first diameter being less than the second diameter, and wherein a portion of the inner wall has a frusto-conical design;
   a vapor director cartridge for holding the crude material;
   a cartridge-holding member designed to receive and hold the vapor director cartridge, the cartridge-holding member having a proximal end adapted for connection to the distal end of the collector and having a distal end adapted to receive the cartridge-holding member;
   a coupler mechanism to sealably join the collector and the cartridge-holding member, wherein the collector and the cartridge-holding member are compressively and sealably joined through combination of a bushing, a seal, the distal end of the collector, and the proximal end of the cartridge-holding member, wherein the seal is uniformly compressed through a screw-driven motion of the bushing; and
   a plunger member dimensioned to be accepted by the collector, wherein the plunger member and the collector are mechanically and sealably joined to form a collector-jacket-valve subassembly, and wherein the plunger member comprises a valve stem and a handle having a central opening therethrough adapted to receive a threaded end of the valve stem, wherein an interior of the handle is further adapted for mechanical connection to the proximal end of the collector.

19. The vacuum sublimation system of claim 18, wherein the collector is a unitary structure that further comprises:
   an acceptor element and a valve seat located at the proximal end of the collector such that the distal end of the valve stem contacts the valve seat when inserted into the proximal end of the collector;
   a vacuum port to establish a sub-atmospheric pressure within the vacuum sublimation system during a sublimation process;
   a tapered upper collector structurally transitioning a portion of the inner wall having the first diameter to a portion of the inner wall having the second diameter; and
   a coolant jacket around the tapered upper collector for cooling the tapered collector, the coolant jacket having an inlet coolant port and an outlet coolant port for circulating a coolant through the coolant jacket and around the tapered upper collector for cooling the vapor to condense the purified solid material onto the inner wall of the tapered upper collector.

* * * * *